UNITED STATES PATENT OFFICE.

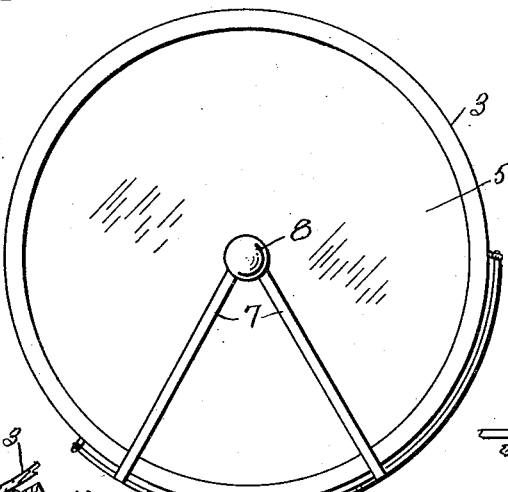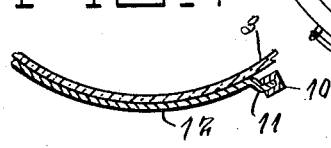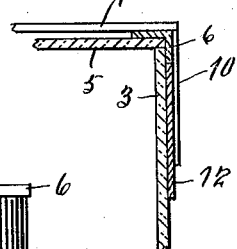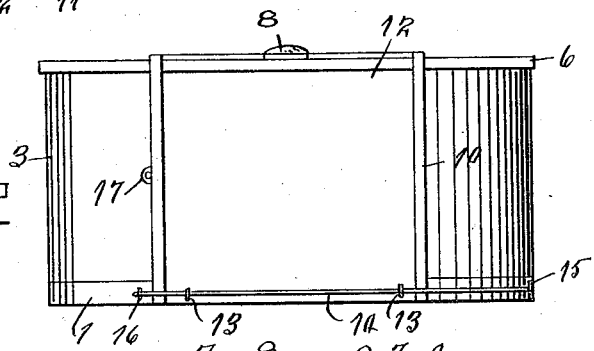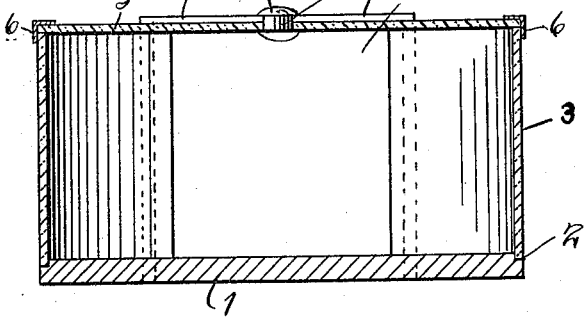

CELLEN MINERVA HANK, OF OAKLAND, CALIFORNIA.

CHEESE-COVER.

1,140,153. Specification of Letters Patent. Patented May 18, 1915.

Application filed May 13, 1914. Serial No. 838,315.

*To all whom it may concern:*

Be it known that I, CELLEN MINERVA HANK, a citizen of the United States, residing at Oakland, in the county of Alameda and State of California, have invented certain new and useful Improvements in Cheese-Covers, of which the following is a specification.

This invention relates to cheese covers, and one of the principal objects of the invention is to provide a glass cover for a cheese having a sliding door, and means for stopping the door at both ends of its movement.

Another object of the invention is to provide a cheese cover preferably formed of glass and transparent so that the cheese may be kept in sight and which will preserve the cheese against mold and also keep the cheese in a sanitary condition out of the reach of flies and other insects.

These and other objects may be attained by means of the construction illustrated in the accompanying drawing, in which, Figure 1 is a top plan view of a cheese cover made in accordance with this invention, Fig. 2 is a front side elevation of the same, Fig. 3 is a vertical sectional view of the same, Fig. 4 is a detail horizontal sectional view of a fragmentary part of the device, and Fig. 5 is a fragmentary sectional view of a portion of the sliding door and its supporting arms.

Referring to the drawing, the numeral 1 designates the base of the cheese cover which is preferably in the form of a wooden disk of the size somewhat larger than the cheese to be contained within the cover. The base 1 is provided with an annular rabbet or recess 2 around the periphery thereof, and seated in the rabbet is the curved glass side portion 3 of the cover, said curved side portion 3 having its terminal edges separated to form a door opening 4 of sufficient dimensions to permit access to the interior of the cover. Resting upon the upper edges of the curved side portion 3 is the glass top or disk 5, and for securing the top to the side member 3 an angle clamp of metal 6 is provided and extends entirely around the cover.

Pivoted centrally of the top 5 are divergent metal arms 7, said arms connected to a small disk 8 provided with a downwardly extending cylindrical portion 9 mounted in an aperture in the top 5. The outer end of the arms 7 are bent downwardly and formed into channel form to provide a binding 10 to receive the outwardly bent edge 11 of the sheet metal door 12.

The door 12 is preferably formed of nickel plated tin, and its lower portion is provided with eyes 13 through which a guide wire 14 passes, said guide wire being secured at one end to the bottom 1 at some distance from the door opening as shown at 15, while the opposite end of the guide wire 14 is secured at 16 near the door opening. The staples 15 and 16 serve as stops for the door 12 in opening and closing the same and the guide wire 14 is spaced a suitable distance from the bottom or disk 1. The door 12 may be provided with a suitable handle or hasp 17.

From the foregoing it will be obvious that a cheese cover made in accordance with this invention will protect a cheese placed upon the disk 1, and is intended to be used in connection with the ordinary cheese cutter for store purposes, the door 12 being readily pushed aside to give access to the cheese when required and when closed will form a practically tight entrance which will prevent mold from forming on the cheese and will always leave the cheese in sight and keep it in a wholesome and sanitary condition.

Various changes may be made in the details of construction without departing from the spirit and scope of the invention as defined in the claim.

What is claimed is:—

A cheese cover comprising a curved glass side, a glass disk top secured to the upper edge of the side, said side having a door-opening therein, and a door for closing said opening, said door being provided with divergent arms pivoted centrally to the top, depending arms connected to the divergent arms and provided with a channel for receiving the edge of the door, said depending arms being offset to form a close contact of the door against the side, a guide for said door, and stops to limit the outward and inward movement of said door.

In testimony whereof I affix my signature in presence of two witnesses.

MRS. C. MINERVA HANK.

Witnesses:
PERCY L. BLISS,
GLADYS E. HANK.

Copies of this patent may be obtained for five cents each, by addressing the "Commissioner of Patents, Washington, D. C."